Jan. 10, 1967 W. A. MORGAN ETAL 3,297,943
ELECTROMETRIC SYSTEM WITH AUTOMATIC
TEMPERATURE COMPENSATING MEANS
Filed Aug. 22, 1962

INVENTORS.
WALTER A. MORGAN,
JEAN H. KARCHMER,
BY Frank S. Troidl
ATTORNEY.

United States Patent Office 3,297,943
Patented Jan. 10, 1967

3,297,943
ELECTROMETRIC SYSTEM WITH AUTOMATIC TEMPERATURE COMPENSATING MEANS
Walter A. Morgan, Baytown, and Jean H. Karchmer, Houston, Tex., assignors, by mesne assignments, to Esso Research and Engineering Company, Elizabeth, N.J., a corporation of Delaware
Filed Aug. 22, 1962, Ser. No. 218,681
1 Claim. (Cl. 324—31)

This invention relates to electrometric systems. More particularly, this invention is an improved electrometric system including automatic temperature compensating means.

In one of its specific aspects, the invention is an improved, portable polarograph with automatic temperature compensating means.

In polarographic determinations, such as the determination of dissolved oxygen in effluent waters, current readings are obtained which are proportional to the oxygen concentration in the water sample. However, the current readings are not only proportional to the oxygen concentration in the water sample but also are affected by temperature variations. Therefore, the indicated current must be corrected in order to obtain the actual amount of dissolved oxygen in the effluent waters.

In order to correct the current readings for temperature variations, time-consuming and tedious mathematical computations are required. The advantage of having an automatic temperature compensating system for such electrometric determinations is obvious. The invention to be described herein provides the art with an electrometric system, such as a polarographic system, which includes, among other things, an automatic temperature compensating circuit.

Briefly described, the invention includes a means for holding the sample of material having characteristics such that the current through it is dependent upon temperature. An electrical network is used to apply a direct current electrical potential across a pair of electrical terminals in the cell. A large gain amplifier is included in the electrical network with a current line leading from one of the terminals in the cell to the large gain amplifier. A feed-back circuit with a temperature compensating line including a temperature sensitive resistor element is included to feed back a current to the current line to compensate for current variations from the terminals due to temperature variations.

In addition, a variable damping circuit is provided in this new electrometric system. The variable damping circuit makes this new system adaptable to any of the three electrode types currently in use: the conventional dropping mercury electrode, the solid platinum-membrane electrode, or the recently developed rapid dropping mercury electrode disclosed in Patent No. 2,993,846, issued July 25, 1961 to C. P. Tyler.

The invention, as well as its many advantages, will be further understood by reference to the following detailed description and drawings in which.

Figure 1:
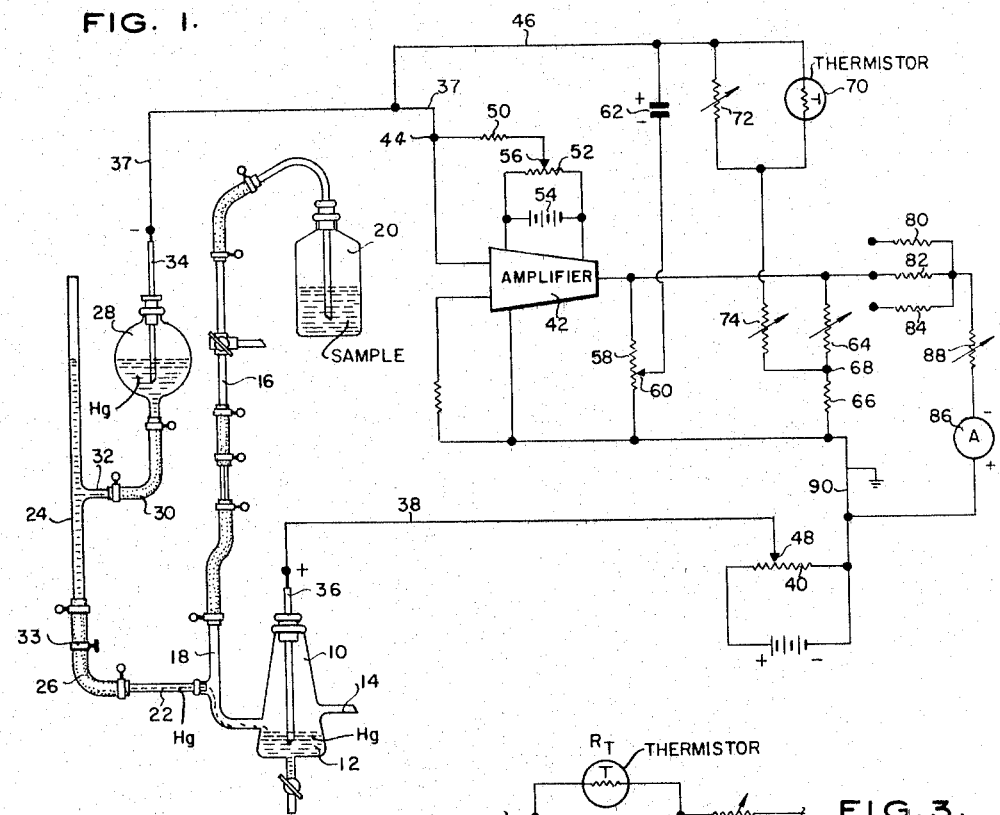
FIG. 1 is an electrical diagram showing the improved system using a rapid dropping mercury electrode-type polarographic cell.

Referring to the drawings and more partciularly to FIG. 1, the new and improved electrometric system is shown using a rapid dropping mercury electrode such as that shown in Patent No. 2,993,846, issued July 25, 1961 to C. P. Tyler. The polarographic cell includes a vessel 10 which is partially filled with mercury 12. Vessel 10 is provided with an outlet 14.

Flexible tubing 16 is connected to a L-shaped arm 18 and also to a sample container 20. Thus, the sample to be measured is flowed from the container 20 through tubing 16 and arm 18 into vessel 10 and out from outlet 14.

A rapid dropping electrode 22 is connected to the member 18. Electrode 22 is horizontally mounted so that the drops of mercury from electrode 22 will flow down the arm 18 and into the mercury pool 12.

A vertically-extending tube 24 is connected to the electrode 22 through a flexible rubber or plastic tube 26. To provide a mercury head to electrode 22, a mercury reservoir 28 is disposed at a predetermined level above the electrode 22. The reservoir 28 is connected to the electrode by means of a flexible tube 30, arm 32, tube 24, and flexible tube 26. A screw clamp 33 for stopping mercury flow is mounted about flexible tube 26.

Electrodes 34 and 36 are mounted so as to extend into the mercury contained in reservoir 28 and the mercury contained in reservoir 12, respectively. An electric potential is established across the cell by means of lines 37 and 38 connected to the electrodes 34 and 36, respectively.

The potential applied to the polarographic cell is obtained from the voltage adjusting potentiometer 40 and connects to the cell leads 37 and 38. A large gain amplifier 42 is included in the electrical network. The large gain amplifier 42 may be an amplifier manufactured by the Burr-Brown Research Corporation of Tuscon, Arizona and designated by them as a Model 1303 Operational Amplifier. The current line 37 leads from the terminal 34 to the large gain amplifier 42.

Junction 44 of lead line 37 and current line 46 may be termed the "summing point" of the operational high gain amplifier 42. Junction 44 is maintained at essentially ground potential by means of negative feedback around the operational amplifier 42. Thus, the potential difference between electrodes 34 and 36 (the cell voltage) is the same as the voltage that exists between the wiper 48 of the voltage-adjusting potentiometer 40 and ground.

Four currents are algebraically summed at the summing point 44. These currents are:
(1) The current through the polarographic cell;
(2) A D.C. feed-back current proportional to the cell current;
(3) An A.C. damping current proportional to the rate of change of cell current; and
(4) A constant D.C. bias current which is used to "buck out" any residual current through the polarographic cell which exists with zero concentration of the measured component present in the cell.

The D.C. bias current is produced by establishing a potential difference across resistor 50 by means of the potentiometer 52 which is connected between the positive and negative supply of the battery 54 which also supplies power to the operational amplifier 42. Since the voltage from the wiper 56 of potentiometer 52 to ground can be either positive or negative, the direction of electron current flow can be either into or away from the summing point 44.

The A.C. damping current proportional to the rate of change of the cell current is obtained by means of the potentiometer 58 connected to the output from operational amplifier 42. The signal obtained from the wiper 60 of potentiometer 58 is connected to the summing point 44 through the capacitor 62. The magnitude of the damping current is proportional to the position of the wiper on potentiometer 58 and the rate of change of the output voltage from amplifier 42.

The means for obtaining a D.C. feed-back current proportional to the cell current and cell current variations caused by changes in temperature will now be described. The output voltage from the operational amplifier 42 is impressed across a voltage divider composed of resistors 64 and 66. The voltage existing at the junction 68 of resistors 64 and 66 is supplied to a feed-back resistor network which converts the feed-back voltage into a current which is supplied to the summing point.

The feed-back resistor network includes a temperature sensitive resistor element, such as thermistor 70, in parallel with resistor 72. Thermistor 70 may be a Thermistor Type GB34P92 manufactured by Fenwal Electronics, Inc. The thermistor 70 and resistor 72 are connected in series with a resistor 74. The thermistor 70 is maintained at the same temperature as the temperature of the sample. This can be done, for example, by including the thermistor (represented by an electrical symbol in FIG. 1 and FIG. 3) in the sample portion of vessel 10 of FIG. 1. Adjustable resistors 72 and 74 are used to obtain the desired resistance-temperature characteristics of the feed-back network. The adjustable resistor 64 is used to adjust the over-all gain of the D.C. feed-back loop.

The purpose of the temperature-compensating circuit is to automatically eliminate the effect of temperature-dependent variables from the output information from the analytical instrument. This objective is achieved by automatically adjusting the over-all gain of the instrument in response to temperature variations in the measured parameter. Although the following derivations of the equations for this technique will be based upon the determination of dissolved oxygen in effluent waters by polarographic determinations, the theory and derivations are applicable to essentially all types of temperature-compensating problems.

When a polarographic instrument is operated at a fixed cell voltage, the cell current $I_o$ is a function of the concentration C of the measured variable and of the cell temperature $T_o$ as indicated in the following equation:

$$I_o = C i_R f (T_o - T_R) \quad (1)$$

$I_o$=observed current in amperes at temperature $T_o$
$C$=concentration of measured variable in parts per million
$i_R$=observed current per unit of C at $T_R$ in amperes per part/million concentration
$T_R$=reference temperature, °F.
$T_o$=observed temperature, °F.
$f(T_o - T_R)$=the temperature induced variation in $I_o$ over the temperature interval $T_o - T_R$.

Figure 2:
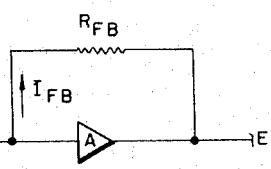

Hence, the direct measurement of $I_o$ indicates the concentration of the measured variable C accurately only at the reference temperature $T_R$. To overcome temperature dependence, a circuit consisting of an operational amplifier and a temperature sensitive feed-back loop is inserted between the observed variable and the output information from the analyzer as shown in FIG. 2.

The equations relating E and $I_o$ are developed in the following manner:

$$E = A (I_o - I_{FB}) \quad (2)$$

$E$=output signal from compensating circuit
$A$=amplifier gain in volts/amp. of input current $A \approx \infty$
$I_o$=Observed input current to summing point
$I_{FB}$=feed-back current to summing point $$I_{FB} = E/R_{FB} \quad (3)$$

$R_{FB}$=resistance in the amplifier negative feed-back circuit at temperature $T_o$ Substituting Equation 3 in Equation 2 and solving for E $$E = \left(\frac{A}{A + R_{FB}}\right) I_o R_{FB} \quad (4)$$

Now since A was defined as the amplifier gain in volts/amp., A has the units of "ohms." If A is made very large ($A \approx \infty$), $$\frac{A}{A + R_{FB}} \approx 1$$

Substituting Equation 5 in Equation 4

$$E = I_o R_{FB} \quad (6)$$

Having obtained the equation relating E and $I_o$, we can now substitute the value of $I_o$ from Equation 1 into Equation 6.

$$E = C i_R R_{FB} f (T_o - T_R) \quad (7)$$

$E$=volts
$R_{FB}$=ohms

Now since the objective is to make E proportional to C alone, the above equation indicates that this can be accomplished if $$R_{FB} f (T_o - T_R) = 1 \quad (8)$$

at all temperatures $T_o$.

Unfortunately, a simple compensating circuit of the type used in this instrument is not capable of providing perfect compensation at all temperatures. Hence, Equation 8 will only be satisfied at a few preselected temperatures. For most applications this is not a significant limitation since the deviation from perfect compensation is very small at intermediate temperature values.

$f(T_o - T_R)$ can be expressed in the form:

$$f(T_o - T_R) = \frac{I_o}{I_R} \quad (9)$$

$I_o$=observed current at temperature $T_o$ for concentration C of the measured variable
$I_R$=observed current in ampers at temperature $T_R$ for concentration C of the measured variable At this point in the derivation, we must define the temperatures at which we want to obtain perfect compensation. Since the feed-back circuit contains two adjustable resistors in the feed-back circuit (plus the temperature-sensing resistor), two temperatures in addition to the reference temperature can be specified. These are:

$T_R$=reference temperature in °F.
$T_1$=an observed temperature in °F. lower than $T_R$
$T_2$=an observed temperature in °F. higher than $T_R$ Let us further define $$P_{(T_1)} = f(T_1 - T_R) = \frac{I_1}{I_R} \quad (10)$$

$$P_{(T_2)} = f(T_2 - T_R) = \frac{I_2}{I_R} \quad (11)$$

$R_{FB(T_1)}$=feed-back resistance at temperature $T_1$ $R_{FB(T_2)}$=feed-back resistance at temperature $T_2$ For Equation 8 to be satisfied at temperatures $T_1$, $T_2$, and $T_R$:

$$\frac{R_{FB(T_1)}}{R_{FB(T_R)}} = \frac{1}{P_{(T_1)}} = K_1 \quad (12)$$

$$\frac{R_{FB(T_2)}}{R_{FB(T_R)}} = \frac{1}{P_{(T_2)}} = K_2 \quad (13)$$

Figure 3:
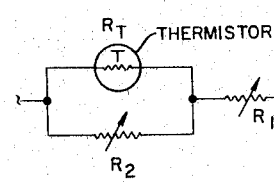
FIGS. 2 and 3 are electrical schematic diagrams useful in explaining the operation of the system.

Since the feed-back circuit has the form shown in FIG. 3, the value of $R_{FB}$ at any temperature is:

$$R_{FB} = R_1 + \frac{R_T R_2}{R_T + R_2} \quad (14)$$

therefore, $$K_1 = \frac{R_1 + \frac{R_{T_1} R_2}{R_{T_1} + R_2}}{R_1 + \frac{R_{T_R} R_2}{R_{T_R} + R_2}} \qquad (15)$$

$$K_2 = \frac{R_1 + \frac{R_{T_2} R_2}{R_{T_2} + R_2}}{R_1 + \frac{R_{T_R} R_2}{R_{T_R} + R_2}} \qquad (16)$$

where $R_{T_1}$ = the resistance of the thermistor $R_T$ at temperature $T_1$ in ohms
$R_{T_2}$ = the resistance at $T_2$ in ohms
$R_{T_R}$ = the resistance at $T_R$ in ohms Solving Equations 15 and 16 for $R_1$ and $R_2$ yields:

$$R_2 = \frac{K_1(R_{T_R} - R_{T_2})R_{T_1} + K_2(R_{T_1} - R_{T_R})R_{T_2} - (R_{T_1} - R_{T_2})R_{T_R}}{(R_{T_1} - R_{T_2}) - K_1(R_{T_R} - R_{T_2}) - K_2(R_{T_1} - R_{T_R})} \qquad (17)$$

$$R_1 = \frac{\frac{K_1 R_{T_R} R_2}{R_{T_R} + R_2} - \frac{R_{T_1} R_2}{R_{T_1} + R_2}}{1 - K_1} \qquad (18)$$

Figure 4:
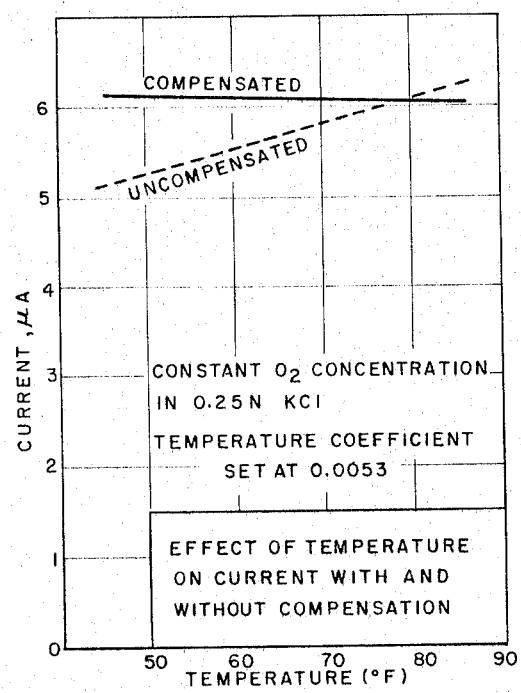
FIG. 4 is a graph showing the effect of the temperature on current with and without the compensating network.

FIG. 4 shows the effect graphically of the temperature compensation circuit. A synthetic solution of dissolved oxygen in water was prepared using 0.25 N KCl as an electrolyte. Current readings for the same sample at different temperatures were obtained. The current readings were taken with a conventional polarograph (i.e., one without automatic temperature compensation). These data are plotted in FIG. 4 as the broken line. From these data it was computed that the temperature coefficient was 0.0053 per degree Fahrenheit. Accordingly, the resistances of the automatic compensator were set for this factor; and the identical experiment was repeated. These results are shown as the full line in FIG. 4 where it may be observed that the effect of temperature has been effectively nullified.

(a) To obtain the resistances of the automatic compensator, a reference temperature $T_R$ of 75° F. was selected. Temperature $T_1$ was selected as 45° F.; temperature $T_2$ was selected as 86° F. Throughout the subsequent explanation, subscript 1 refers to current, resistance, or temperature at 45° F.; subscript R refers to current, resistance, or temperature at 75° F.; and subscript 2 refers to current, resistance, or temperature at 86° F.

(b) The resistance of the temperature sensing thermistor 70 was experimentally measured at 45° F., 75° F., and 86° F.

(c) $K_1$ was evaluated using Equation 12. $K_2$ was evaluated using Equation 13.

(d) Resistances $R_2$ and $R_1$ were evaluated using Equations 17 and 18 by substituting the values obtained by steps (b) and (c) above.

(e) Resistor $R_1$ (74) was adjusted to the value calculated in (d) above using a Wheatstone bridge. Resistor $R_2$ (72) was adjusted to the value calculated in (d) above using a Wheatstone bridge.

Referring again to FIG. 1, it can be seen that in addition to providing the necessary feed-back current, the output signal from amplifier 42 is fed through one of the attenuator resistors 80, 82, or 84 to a meter 86. The meter resistor 88 is adjusted to a value such that the resistors of the meter plus resistor 88 are, say 100 ohms in order to provide accurate attenuator ranges. The circuit through meter 86 is completed back to negative line 90.

Although this invention has been described with reference to the polarographic determination of oxygen, it can be used for many other simple polarographic applications. The thermistor temperature compensator can be used with other electrometric instruments, such as pH and conductivity meters, in which temperature-induced variations in the measured parameter must be minimized.

We claim:

A polarograph system comprising: a polarographic cell having a first electrode and a second electrode spaced from said first electrode; a large gain amplifier having at least five terminals; a voltage adjusting potentiometer; an electrical conductor connected to said first electrode and to the first terminal of the large gain amplifier; an electrical conductor connected to said second electrode and to the wiper of said voltage adjusting potentiometer; an electrical conductor at ground potential connected to the second terminal of the large gain amplifier and to the voltage adjusting potentiometer; an output voltage line connected to the third terminal of the large gain amplifier; a voltage divider connected across the output voltage line and said electrical conductor connected to the second terminal of the large gain amplifier; a D.C. feed-back loop connected to the voltage divider and to the electrical conductor connected to said first electrode, said D.C. feed-back loop including a thermistor in parallel with a first adjustable resistor and a second adjustable resistor in series with said thermistor and said first adjustable resistor; a battery connected across the fourth terminal and the fifth terminal of the large gain amplifier; a bias potentiometer connected across said battery; a resistor connected to the wiper of said bias potentiometer and to the electrical conductor connected to said first electrode; an A.C. damping current potentiometer connected across the output voltage line of the large gain amplifier and the electrical conductor connected to the second terminal of the large gain amplifier; and a capacitor connected to the wiper of said A.C. damping current potentiometer and to the electrical conductor connected to said first electrode.

References Cited by the Examiner

UNITED STATES PATENTS

| | | | |
|---|---|---|---|
| 2,232,211 | 2/1941 | Cary | 324—62 |
| 2,311,976 | 2/1943 | Coleman | 324—30 |
| 2,350,378 | 6/1944 | Wallace | 324—30 X |
| 2,505,936 | 5/1950 | Behn | 324—30 |
| 2,621,235 | 12/1952 | Jewell | 324—30 |
| 2,674,719 | 4/1954 | Williams | 324—62 |
| 2,760,922 | 8/1956 | Williams | 324—62 |
| 2,802,174 | 8/1957 | Staunton | 324—30 |

RUDOLPH V. ROLINEC, *Primary Examiner.*

FREDERICK M. STRADER, WALTER L. CARLSON,
*Examiners.*

C. F. ROBERTS, *Assistant Examiner.*